United States Patent
Ono et al.

(10) Patent No.: US 12,353,932 B2
(45) Date of Patent: Jul. 8, 2025

(54) CONTROL DEVICE, CONTROL METHOD, AND NON-TRANSITORY COMPUTER READABLE MEDIUM FOR USING UNUSED SIGNAL LINES IN CASE OF ERROR IN COMMUNICATION INTERFACE

(71) Applicant: FUJIFILM Business Innovation Corp., Tokyo (JP)

(72) Inventors: Yoshihiro Ono, Kanagawa (JP); Kazuya Suzuki, Kanagawa (JP); Satoshi Isobe, Kanagawa (JP); Shimpei Kawashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 467 days.

(21) Appl. No.: 17/711,492

(22) Filed: Apr. 1, 2022

(65) Prior Publication Data
US 2023/0081383 A1 Mar. 16, 2023

(30) Foreign Application Priority Data
Sep. 10, 2021 (JP) .................................. 2021-148165

(51) Int. Cl.
*G06K 15/00* (2006.01)
*G06F 3/12* (2006.01)

(52) U.S. Cl.
CPC ......... *G06K 15/406* (2013.01); *G06F 3/1203* (2013.01); *G06F 3/1236* (2013.01); *G06K 15/4045* (2013.01)

(58) Field of Classification Search
None
See application file for complete search history.

(56) References Cited

U.S. PATENT DOCUMENTS

| 8,832,422 | B2 | 9/2014 | Oyasato | |
|---|---|---|---|---|
| 10,606,530 | B2 | 3/2020 | Tsujii | |
| 2004/0044619 | A1* | 3/2004 | Chung | G06Q 20/04 705/39 |
| 2008/0246774 | A1* | 10/2008 | Yadav | G06F 21/84 345/522 |

(Continued)

FOREIGN PATENT DOCUMENTS

| JP | 2006-215914 A | | 8/2006 |
|---|---|---|---|
| JP | 2009105712 A | * | 5/2009 |

(Continued)

OTHER PUBLICATIONS

Kishimoto, JP-2009105712-A English Translation, par 0018-0023, 0038 (Year: 2009).*

*Primary Examiner* — Miya J Cato
(74) *Attorney, Agent, or Firm* — Oliff PLC

(57) ABSTRACT

A control device includes a first control substrate including a processor and a communication interface; and a second control substrate including a processor and a communication interface. The first control substrate and the second control substrate are connected through the communication interfaces. When occurrence of an error in data communication through the communication interfaces is detected, at least one of the processor of the first control substrate and the processor of the second control substrate performs the data communication using unused signal lines among signal lines provided in the communication interfaces.

20 Claims, 3 Drawing Sheets

(56) References Cited

U.S. PATENT DOCUMENTS

| | | | | |
|---|---|---|---|---|
| 2014/0059390 A1* | 2/2014 | Nulkar | ............... | G06F 11/0778 |
| | | | | 714/37 |
| 2015/0309892 A1* | 10/2015 | Ramasubramaniam | ................. | |
| | | | | G06F 11/3027 |
| | | | | 714/4.5 |
| 2015/0378852 A1* | 12/2015 | Saintes | ............... | G06F 11/2007 |
| | | | | 714/5.1 |
| 2020/0278733 A1* | 9/2020 | Li | ............................ | G06F 1/28 |

FOREIGN PATENT DOCUMENTS

| | | |
|---|---|---|
| JP | 2012-15812 A | 1/2012 |
| JP | 2017-156624 A | 9/2017 |

* cited by examiner

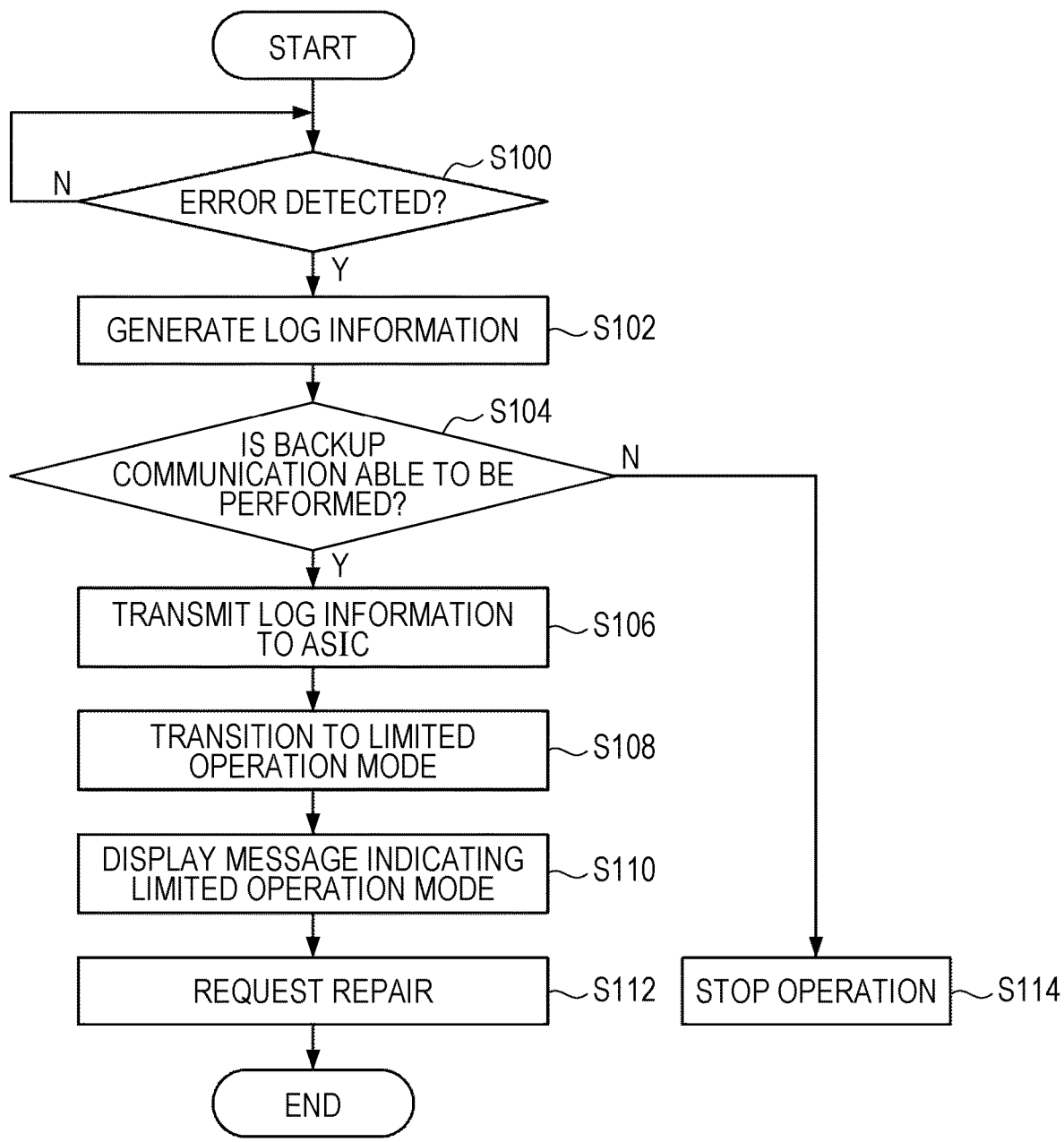

CONTROL DEVICE, CONTROL METHOD, AND NON-TRANSITORY COMPUTER READABLE MEDIUM FOR USING UNUSED SIGNAL LINES IN CASE OF ERROR IN COMMUNICATION INTERFACE

CROSS-REFERENCE TO RELATED APPLICATIONS

This application is based on and claims priority under 35 USC 119 from Japanese Patent Application No. 2021-148165 filed Sep. 10, 2021.

BACKGROUND

(i) Technical Field

The present disclosure relates to a control device, a control method, and a non-transitory computer readable medium.

(ii) Related Art

In Japanese Unexamined Patent Application Publication No. 2012-15812, an image forming apparatus including a code storing device as a processing device that stores boot code, a code execution device as a processing device that executes booting based on the boot code acquired from the code storing device, communication means for allowing connection between the code storing device and the code execution device, and high-speed communication means for allowing connection between the code storing device and the code execution device, the communication speed of the high-speed communication means being higher than the communication speed of the communication means, is disclosed. The code storing device includes code storing means for storing high-speed enabling code, which is the boot bode for enabling the code execution device to use the high-speed communication means, and high-speed relay code, which is the boot code transmitted to the code execution device via the high-speed communication means, and code transmitting means for transmitting, after transmitting the high-speed enabling code to the code execution device via the communication means, the high-speed relay code to the code execution device via the high-speed communication means.

In Japanese Unexamined Patent Application Publication No. 2006-215914, an image forming apparatus of a distributed control type including main control means for controlling the entire equipment and operation unit control means for controlling key inputs on an operation unit and display, is disclosed. The main control means and the operation unit control means are connected by both a start-stop synchronous communication line and a clock synchronous serial communication line, which allows communication at a speed higher than that of the start-stop synchronous communication line.

SUMMARY

Aspects of non-limiting embodiments of the present disclosure relate to a control device, a control method, and a non-transitory computer readable medium that are capable of allowing an apparatus that includes the control device to be able to be used continuously even in a case where an error has occurred in data communication through a communication interface that connects two control substrates.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control device including a first control substrate including a processor and a communication interface; and a second control substrate including a processor and a communication interface, wherein the first control substrate and the second control substrate are connected through the communication interfaces, and wherein when occurrence of an error in data communication through the communication interfaces is detected, at least one of the processor of the first control substrate and the processor of the second control substrate performs the data communication using unused signal lines among signal lines provided in the communication interfaces.

BRIEF DESCRIPTION OF THE DRAWINGS

Exemplary embodiments of the present disclosure will be described in detail based on the following figures, wherein:

FIG. 3 is a flowchart illustrating an example of the procedure of a process based on a control program.

DETAILED DESCRIPTION

Hereinafter, exemplary embodiments of the present disclosure will be described with reference to drawings.

Figure 1:
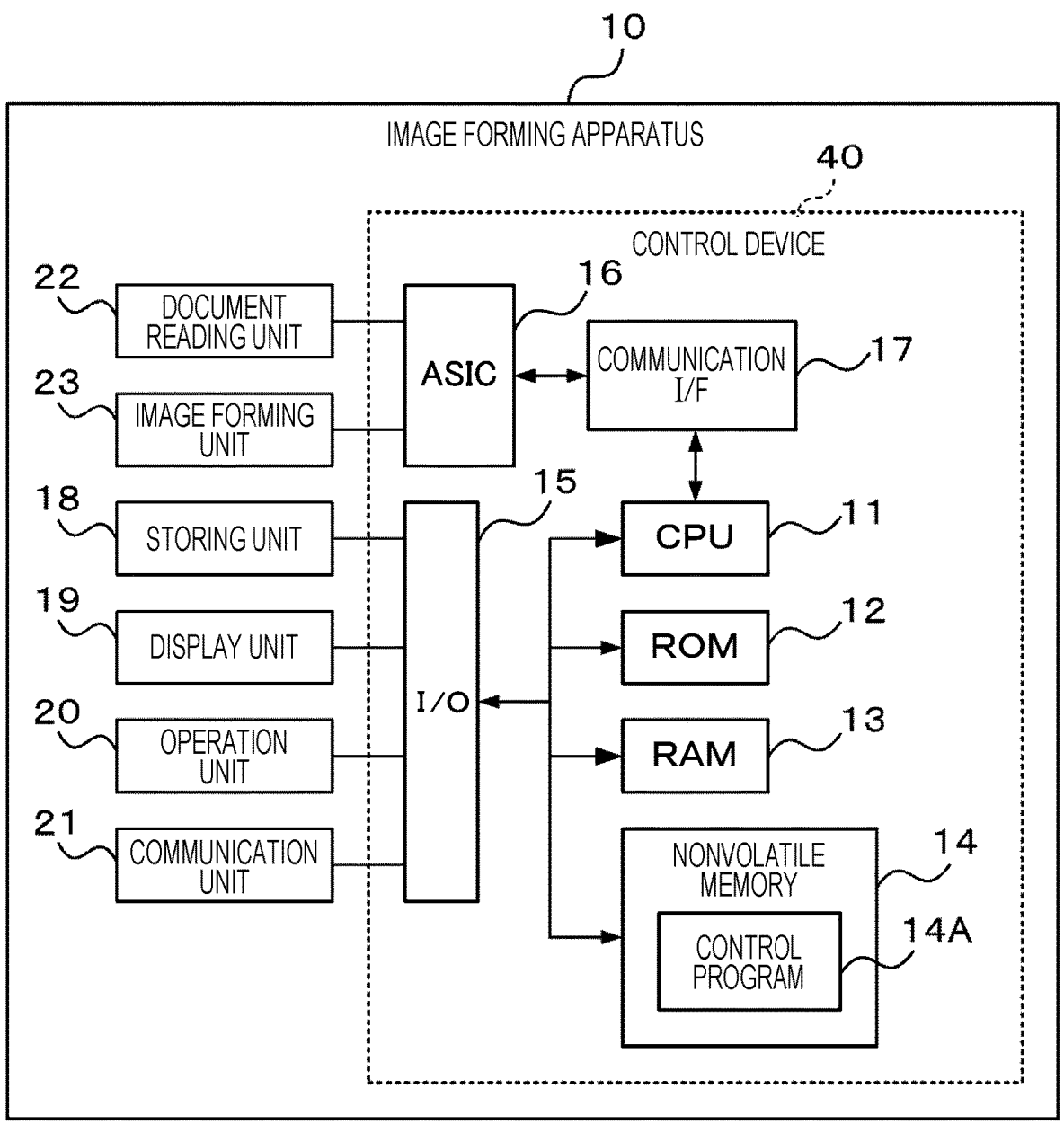
FIG. 1 is a block diagram illustrating an example of the electrical configuration of an image forming apparatus.

FIG. 1 is a block diagram illustrating an example of the electrical configuration of an image forming apparatus 10 according to a first exemplary embodiment.

As illustrated in FIG. 1, the image forming apparatus 10 according to this exemplary embodiment includes a central processing unit (CPU) 11, a read only memory (ROM) 12, a random access memory (RAM) 13, a nonvolatile memory 14, an input/output interface (I/O) 15, an application specific integrated circuit (ASIC) 16, a communication interface (I/F) 17, a storing unit 18, a display unit 19, an operation unit 20, a communication unit 21, a document reading unit 22, and an image forming unit 23.

The CPU 11, the ROM 12, the RAM 13, the nonvolatile memory 14, and the I/O 15 are connected via a bus. Functional units including the storing unit 18, the display unit 19, the operation unit 20, the communication unit 21, the document reading unit 22, and the image forming unit 23 are connected to the I/O 15. The storing unit 18, the display unit 19, the operation unit 20, and the communication unit 21 are able to communicate with the CPU 11 via the I/O 15. Furthermore, the document reading unit 22 and the image forming unit 23 are connected to the ASIC 16. The ASIC 16 is able to communicate with the CPU 11 via the communication I/F 17.

The CPU 11, the ROM 12, the RAM 13, the nonvolatile memory 14, the I/O 15, the ASIC 16, and the communication I/F 17 form a control device 40. The control device 40 may be configured to be a sub-controller that controls part of the operation of the image forming apparatus 10 or may be configured to be part of a main controller that controls the entire operation of the image forming apparatus 10. For example, an integrated circuit such as a large scale integration (LSI) or an integrated circuit (IC) chip set may be used as part or all of the blocks of the control device 40. Individual circuits may be used as corresponding blocks or partially or entirely integrated circuits may be used as the individual blocks. The blocks may be provided in an integrated manner or some of the blocks may be provided separately. In each of the blocks, parts of the block may be provided separately. Integration of control does not necessarily adopt LSI. A dedicated circuit or a general-purpose processor may be used for integration of control.

The nonvolatile memory 14 is a memory in which data is able to be rewritten. A control program 14A for the control device 40 according to this exemplary embodiment is stored in the nonvolatile memory 14. The control program 14A may be, for example, installed in advance in the control device 40. Furthermore, the control program 14A may be stored in a nonvolatile storage medium such as a compact disc-read only memory (CD-ROM) and provided or may be downloaded through a network and provided.

The storing unit 18 is, for example, a hard disk drive (HDD), a solid state drive (SSD), or a flash memory. A program, data, and the like related to various functions of the image forming apparatus 10 are stored in the storing unit 18.

The display unit 19 includes, for example, a liquid crystal display (LCD), an organic electroluminescence (EL) display, or the like. The display unit 19 includes a touch panel arranged in an integrated manner.

The operation unit 20 includes, for example, various operation keys including a numeric keypad and a start key. The display unit 19 and the operation unit 20, which serve as an operation panel, receive various instructions from a user of the image forming apparatus 10. The various instructions include, for example, an instruction for starting to read a document and an instruction for starting to copy a document. The display unit 19 displays various types of information including results of processing performed in accordance with an instruction received from a user, a notification regarding the processing, and the like.

The communication unit 21 is connected to a network such as the Internet, a local area network (LAN), or a wide area network (WAN) and is capable of communicating through the network with an external apparatus such as a personal computer (PC).

The document reading unit 22 picks up, one sheet by one sheet, a document placed on a paper feed table of an auto document feeder (not illustrated in FIG. 1) provided in an upper part of the image forming apparatus 10 and optically reads the document to obtain image information. Alternatively, the document reading unit 22 optically reads a document placed on a document table such as a platen glass to obtain image information.

The image forming unit 23 forms on paper, which is an example of a recording medium, an image based on image information obtained by reading using the document reading unit 22. Hereinafter, an electrophotographic method will be explained as an example of a method for forming an image. However, other methods such as an inkjet method may be employed.

In the case where a method for forming an image is an electrophotographic method, the image forming unit 23 includes a photoconductor drum, a charging device, an exposure device, a developing device, a transfer device, and a fixing device. The charging device applies voltage to the photoconductor drum to charge the surface of the photoconductor drum. The exposure device forms an electrostatic latent image on the photoconductor drum by causing the photoconductor drum charged by the charging device to be exposed to light corresponding to image information. The developing device forms a toner image on the photoconductor drum by developing the electrostatic latent image formed on the photoconductor drum using toner. The transfer device transfers the toner image formed on the photoconductor drum onto paper. The fixing device fixes the toner image transferred to the paper by heating and pressurization.

Figure 2:
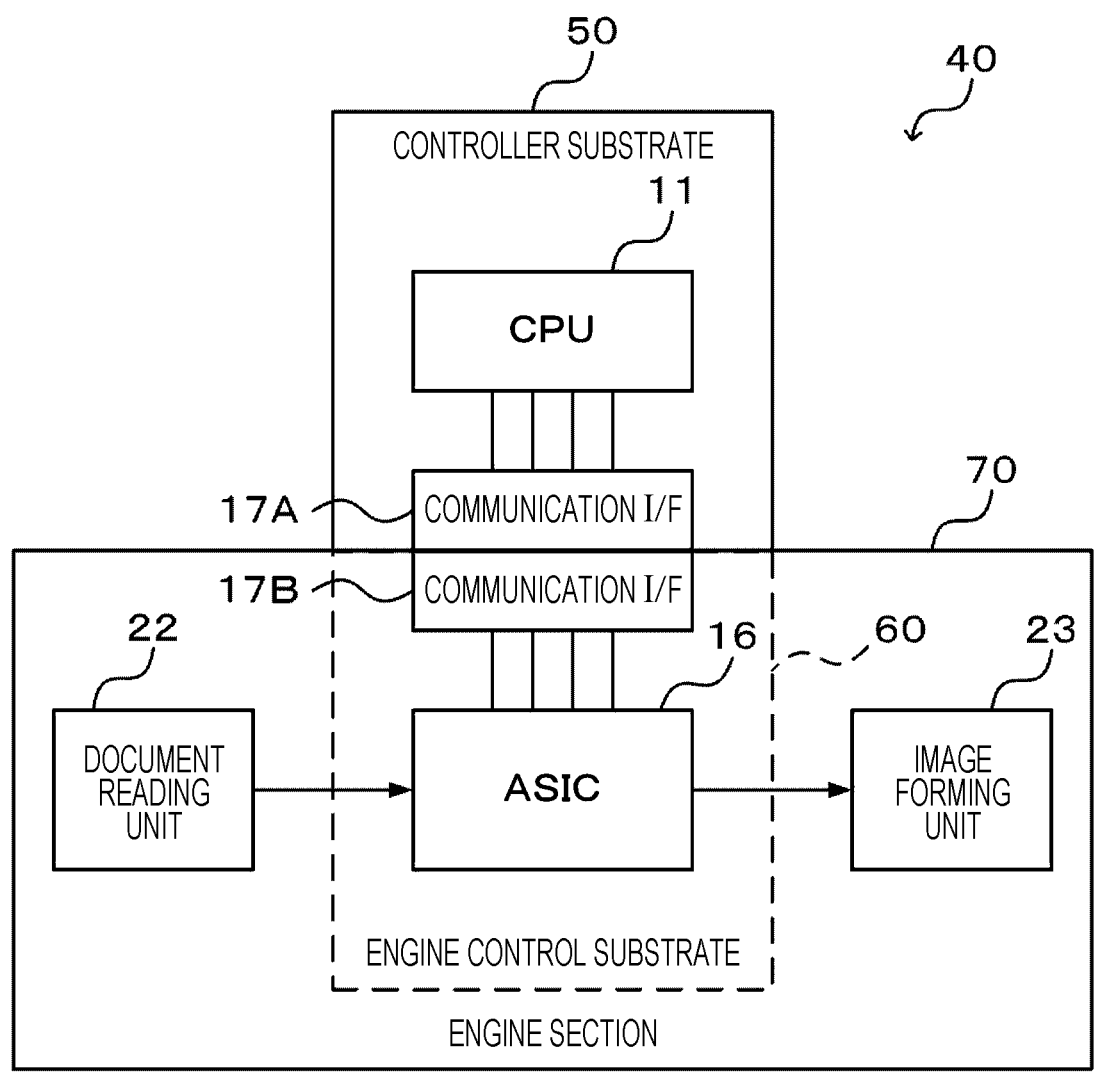
FIG. 2 is a block diagram illustrating an example of the configuration of a control device.

FIG. 2 is a block diagram illustrating an example of the configuration of the control device 40 according to this exemplary embodiment.

As illustrated in FIG. 2, the control device 40 according to this exemplary embodiment includes a controller substrate 50 and an engine control substrate 60. An engine section 70 includes the engine control substrate 60, the document reading unit 22, and the image forming unit 23. The controller substrate 50 is an example of a first control substrate, and the engine control substrate 60 is an example of a second control substrate. The controller substrate 50 includes the ROM 12, the RAM 13, the nonvolatile memory 14, and the I/O 15. For an easier explanation, the ROM 12, the RAM 13, the nonvolatile memory 14, and the I/O 15 are not illustrated in FIG. 2.

The controller substrate 50 includes the CPU 11 and a communication I/F 17A. The CPU 11 is an example of a processor of the first control substrate and controls the entire operation of the image forming apparatus 10.

The engine control substrate 60 includes the ASIC 16 and a communication I/F 17B. The ASIC 16 is an example of a processor of the second control substrate and controls specific processing performed by the image forming apparatus 10, image processing in this exemplary embodiment. The document reading unit 22 inputs image data to the ASIC 16, and the image forming unit 23 outputs image data that has been subjected to image processing received from the ASIC 16. In the case where there is no need to distinguish between the communication I/Fs 17A and 17B, they will be simply referred to as communication I/Fs 17.

The controller substrate 50 and the engine control substrate 60 are separate substrates. When the controller substrate 50 and the engine control substrate 60 are connected through the communication I/Fs 17, the CPU 11 and the ASIC 16 are able to communicate with each other. In this exemplary embodiment, for example, peripheral component interconnect-express (PCIe) is used for the communication I/Fs 17.

The controller substrate 50 and the engine control substrate 60 are separate substrates because the controller substrate 50 and the engine control substrate 60 may be designed by different designers. In this case, errors in data communication may easily occur, compared to the case where the controller substrate 50 and the engine control substrate 60 are designed by a single designer and the CPU 11 and the ASIC 16 are provided in the same substrate. If an error occurs in data communication, the image forming apparatus 10 is not able to be used until the error is resolved.

Thus, by reading the control program 14A stored in the nonvolatile memory 14 onto the RAM 13 and executing the control program 14A, if occurrence of an error in data communication through the communication I/Fs 17 connecting the controller substrate 50 and the engine control substrate 60 is detected, the CPU 11 of the control device 40 according to this exemplary embodiment performs data communication using unused signal lines out of signal lines provided in the communication I/Fs 17. An unused signal line represents a signal line that is not used during a normal operation in which no error occurs in data communication.

As described above, in the case where an error occurs in data communication, a signal line that is not used during a normal operation is used as a signal line for backup communication. Accordingly, even before the repair of the image forming apparatus 10, such as replacement of a substrate, is completed, the image forming apparatus 10 is able to be used continuously.

Unused signal lines among signal lines provided in the communication I/Fs 17 are, for example, two signal lines for controlling connection and disconnection between the communication I/Fs 17A and 17B with the power turned on, that is, hot-plug two signal lines. The controller substrate 50 and the engine control substrate 60 are kept connected by the communication I/Fs 17 while being manufactured, and the controller substrate 50 and the engine control substrate 60 are not disconnected during an operation of the image forming apparatus 10. Thus, the hot-plug two signal lines are unused. Specifically, the communication I/Fs 17 are based on PCIe, and two signal lines for a PRSNT1 signal and a PRSNT2 signal defined by PCIe standards are unused signal lines. In this exemplary embodiment, the case where backup communication using the two unused signal lines for the PRSNT1 signal and the PRSNT2 signal is performed when an error occurs in data communication will be described.

Furthermore, two signal lines for controlling start and reset of the controller substrate 50 and the engine control substrate 60 are another example of the unused signal lines. As described above, the controller substrate 50 and the engine control substrate 60 are kept connected by the communication I/Fs 17 while being manufactured, and the controller substrate 50 and the engine control substrate 60 are not disconnected during an operation of the image forming apparatus 10. Thus, the two signal lines for controlling start and reset of the controller substrate 50 and the engine control substrate 60 are unused. Specifically, the communication I/Fs 17 are based on PCIe, and two signal lines for a WAKE signal and a PERST signal defined by PCIe standards are unused signal lines.

For example, serial communication is used as a method for data communication using unused two signal lines. Specifically, universal asynchronous receiver/transmitter (UART) communication or inter-integrated circuit (I2C) communication is used. However, a method for data communication using unused two signal lines is not limited to UART communication or I2C communication. Data transfer speed of serial communication is lower than that of normal bus communication based on PCIe standards.

Furthermore, data communication may be performed by using four signal lines including two signal lines for controlling connection and disconnection between the communication I/Fs 17 with the power turned on and two signal lines for controlling start and reset of the controller substrate 50 and the engine control substrate 60 as unused signal lines and using the four signal lines as four signal lines for an SCLK signal, a SIMO signal, a SOMI signal, and an SS signal that are based on serial peripheral interface (SPI) standards.

Specifically, the communication I/Fs 17 are based on PCIe, and data communication may thus be performed using the four signal lines for a PRSNT1 signal, a PRSNT2 signal, a WAKE signal, and a PERST signal defined by PCIe standards as four signal lines for an SCLK signal, a SIMO signal, a SOMI signal, and an SS signal that are based on SPI standards.

Although the CPU 11 detects occurrence of an error in the case described above, the ASIC 16 may detect occurrence of an error. That is, a control program may be stored in a nonvolatile memory for the ASIC 16 of the engine control substrate 60 in which data is able to be rewritten, and the ASIC 16 may execute the control program. In this case, as with the CPU 11, in the case where the ASIC 16 executes the control program, when the ASIC 16 detects occurrence of an error in data communication through the communication I/Fs 17 connecting the controller substrate 50 and the engine control substrate 60, the ASIC 16 performs data communication using unused signal lines among signal lines provided in the communication I/Fs 17. Furthermore, both the CPU 11 and the ASIC 16 are able to execute the control program.

Next, a control process performed by the CPU 11 of the control device 40 according to an exemplary embodiment will be described with reference to FIG. 3.

FIG. 3 is a flowchart illustrating an example of the procedure of a process based on a control program according to an exemplary embodiment. First, the power of the control device 40 is turned on. The CPU 11 starts the control program, and performs steps described below. The case where the CPU 11 executes the control program will be described below. However, the same applies to the case where the ASIC 16 executes the control program.

In step S100, the CPU 11 determines whether or not occurrence of an error in data communication through the communication I/Fs 17 connecting the controller substrate 50 and the engine control substrate 60 is detected. The determination as to whether or not an error has occurred in data communication is made by, for example, determining whether or not a response from the ASIC 16 has been received within a predetermined time in the case where data communication requiring a response from the ASIC 16 to data transmitted to the ASIC 16 is performed. Furthermore, in the case where an error detection code is added to data received from the ASIC 16, the determination as to whether or not an error has occurred in data communication may be made by determining whether or not an error in data is detected in accordance with the error detection code. The determination as to whether or not an error has occurred is not limited to the methods described above.

In the case where it is determined that occurrence of an error is detected, the process proceeds to step S102. In the case where occurrence of an error is not detected, the determination as to whether or not an error has occurred in data communication continues to be performed.

In step S102, the CPU 11 generates log information. The log information contains, for example, information indicating circumstances in which the error has occurred in the data communication, such as contents of processing performed by the CPU 11.

In step S104, the CPU 11 determines whether or not backup communication using unused signal lines is able to be performed. Specifically, a procedure for backup communication is determined in advance, and a connection confirmation signal for confirming connection is transmitted to the ASIC 16 through serial communication such as UART using two unused signal lines for a PRSNT1 signal and a PRSNT2 signal. In the case where the ASIC 16 has received a connection confirmation signal, the ASIC 16 transmits a response signal to the CPU 11. In the case where the CPU 11 has received a response signal, the CPU 11 determines that backup communication is able to be performed. In the case where no response signal has been received within the predetermined time, the CPU 11 determines that backup communication is not able to be performed.

In the case where the result of the determination in step S104 is affirmative, the process proceeds to step S106. In the case where the result of the determination in step S104 is negative, the process proceeds to step S114.

In step S106, the CPU 11 transmits, through backup communication, the log information generated in step S102 to the ASIC 16. Accordingly, the ASIC 16 is able to obtain the circumstances in which an error has occurred in the CPU 11.

In step S108, the CPU 11 transitions to a limited operation mode and performs processing that is able to be performed only in the limited operation mode. The limited operation mode is a mode in which only service processes that are able to be provided even through low-speed serial communication using unused two signal lines are performed.

In step S110, the CPU 11 displays, on the display unit 19, a message indicating that the image forming apparatus 10 is operating in the limited operation mode and the list of service processes that are able to be performed in the limited operation mode.

In step S112, the CPU 11 transmits, through a communication line connected to the communication unit 21, repair request information for requesting an external terminal apparatus of a repair person to carry out a repair. Information about instruction for calling a repair person, such as a message "The substrate needs to be replaced. Please call a repair person." may be displayed on the display unit 19.

In contrast, in the case where the result of the determination in step S104 is negative, backup communication is not able to be performed, and no service is able to be provided. Thus, the operation of the image forming apparatus 10 stops. A message indicating that no service is able to be provided may be displayed on the display unit 19.

As described above, according to an exemplary embodiment, in the case where occurrence of an error in data communication through the communication I/Fs 17 that connect the controller substrate 50 and the engine control substrate 60 is detected, data communication is performed using unused signal lines among signal lines provided in the communication I/Fs 17. Accordingly, even before the repair of the image forming apparatus 10, such as replacement of a substrate, is completed, the image forming apparatus 10 is able to be used continuously.

A process similar to the process illustrated in FIG. 3 may be performed by the ASIC 16. In this case, in the description of the process illustrated in FIG. 3, the CPU 11 is replaced with the ASIC 16, and the ASIC 16 is replaced with the CPU 11. However, in the processing of step S110, because the display unit 19 is provided on the controller substrate 50, the ASIC 16 requests, through backup communication, the CPU 11 to perform the processing of step S110. In a similar manner, in the processing of step S112, because the communication unit 21 is provided on the controller substrate 50, the ASIC 16 requests, through backup communication, the CPU 11 to perform the processing of step S112.

In each of the foregoing exemplary embodiments, the case where a control device is used for an image forming apparatus has been described. However, the control device is not necessarily used for an image forming apparatus. Obviously, the control device may be used for other information processing apparatuses such as a server computer and a personal computer.

A control device according to an exemplary embodiment and an image forming apparatus including the control device have been described above. An exemplary embodiment may be implemented as a program for causing a computer to execute functions of the control device. An exemplary embodiment may be implemented as a non-transitory computer readable storage medium storing the program mentioned above.

The configuration of a control device described in an exemplary embodiment described above is merely an example and may be changed according to the circumstances without departing from the scope of the present disclosure.

Furthermore, the procedure of a process based on a program in an exemplary embodiment described above is merely an example. Deletion of unnecessary steps, addition of new steps, and exchange of the processing order may be performed without departing from the scope of the present disclosure.

Furthermore, in each of the foregoing exemplary embodiments, a case where a process according to the exemplary embodiment is implemented by executing a program with a software configuration using a computer has been described. However, the present disclosure is not limited to this case. For example, an exemplary embodiment may be implemented by a hardware configuration or a combination of a hardware configuration and a software configuration.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control device comprising:
    a first control substrate including a processor and a communication interface; and
    a second control substrate including a processor and a communication interface,
    wherein the first control substrate and the second control substrate are connected through the communication interfaces, and
    wherein when occurrence of an error in data communication through the communication interfaces is detected, at least one of the processor of the first control substrate and the processor of the second control substrate performs the data communication using unused signal lines among signal lines provided in the communication interfaces, and
    the unused signal lines are low-speed signal lines that are never used during normal operation without an error and that perform a limited operation than a signal line in which the error occurred in the communication interfaces.

2. The control device according to claim 1, wherein the unused signal lines are two signal lines for controlling connection and disconnection between the communication interfaces with a power turned on.

3. The control device according to claim 2, wherein the communication interfaces are based on PCIe, and the two signal lines are two signal lines for a PRSNT1 signal and a PRSNT2 signal that are defined by PCIe standards.

4. The control device according to claim 3, wherein the processors are configured to execute the data communication through serial communication.

5. The control device according to claim 4, wherein the serial communication is UART communication or I2C communication.

6. The control device according to claim 2, wherein the processors are configured to execute the data communication through serial communication.

7. The control device according to claim 6, wherein the serial communication is UART communication or I2C communication.

8. The control device according to claim 2, wherein the processor is configured to, in a case where the data communication is able to be performed using the unused signal lines, perform a service process that is able to be performed in a limited operation mode.

9. The control device according to claim 1, wherein the unused signal lines are two signal lines for controlling start and reset of the first control substrate or the second control substrate.

10. The control device according to claim 9, wherein the communication interfaces are based on PCIe, and the two signal lines are two signal lines for a WAKE signal and a PERST signal that are defined by PCIe standards.

11. The control device according to claim 10, wherein the processors are configured to execute the data communication through serial communication.

12. The control device according to claim 11, wherein the serial communication is UART communication or I2C communication.

13. The control device according to claim 9, wherein the processors are configured to execute the data communication through serial communication.

14. The control device according to claim 13, wherein the serial communication is UART communication or I2C communication.

15. The control device according to claim 1, wherein the data communication is performed by using, as the unused signal lines, four signal lines including two signal lines for controlling connection and disconnection between the communication interfaces with a power turned on and two signal lines for controlling start and reset of the first control substrate or the second control substrate and using the four signal lines as four signal lines for an SCLK signal, a SIMO signal, a SOMI signal, and an SS signal that are based on SPI standards.

16. The control device according to claim 15, wherein the communication interfaces are based on PCIe, and the four signal lines are four signal lines for a PRSNT1 signal, a PRSNT2 signal, a WAKE signal, and a PERST signal that are defined by PCIe standards.

17. The control device according to claim 1, wherein the processor is configured to, in a case where the data communication is able to be performed using the unused signal lines, perform a service process that is able to be performed in a limited operation mode.

18. The control device according to claim 17, wherein the processor is configured to display, on a display unit, a list of service processes that are able to be performed in the limited operation mode.

19. A control method comprising:
when occurrence of an error in data communication through communication interfaces is detected, performing the data communication using unused signal lines among signal lines provided in the communication interfaces, wherein
the unused signal lines are low-speed signal lines that are never used during normal operation without an error and that perform a limited operation than a signal line in which the error occurred in the communication interfaces.

20. A non-transitory computer readable medium storing a program causing a computer to execute a process comprising:
when occurrence of an error in data communication through communication interfaces is detected, performing the data communication using unused signal lines among signal lines provided in the communication interfaces, wherein
the unused signal lines are low-speed signal lines that are never used during normal operation without an error and that perform a limited operation than a signal line in which the error occurred in the communication interfaces.

\* \* \* \* \*